United States Patent [19]

Penney

[11] Patent Number: 4,696,574
[45] Date of Patent: Sep. 29, 1987

[54] PRECISION REMOTE LOCATION OF A MOVABLE POINT EMPLOYING LIGHT INTERFERENCE FRINGES

[75] Inventor: Carl M. Penney, Schenectady, N.Y.

[73] Assignee: General Electric Company, Schenectady, N.Y.

[21] Appl. No.: 898,565

[22] Filed: Aug. 21, 1986

Related U.S. Application Data

[63] Continuation of Ser. No. 622,906, Jun. 21, 1984, abandoned.

[51] Int. Cl.⁴ .................. G01B 11/14; B25J 19/00
[52] U.S. Cl. ...................... 356/375; 356/373; 901/47
[58] Field of Search ................ 356/373–375, 356/356, 28.5; 901/47

[56] References Cited

U.S. PATENT DOCUMENTS

| | | | |
|---|---|---|---|
| 3,779,647 | 12/1973 | Dawson | 356/109 |
| 3,866,055 | 2/1975 | Pike | 250/564 |
| 3,891,321 | 6/1975 | Hock | 356/356 |
| 3,897,152 | 7/1975 | Farmer et al. | 356/28.5 |
| 3,930,734 | 1/1976 | Holly et al. | 356/28.5 |
| 4,086,808 | 5/1978 | Camac | 73/655 |
| 4,142,796 | 3/1979 | Riva | 356/28.5 |
| 4,169,980 | 10/1979 | Zanoni | 250/550 |
| 4,259,009 | 3/1981 | Vernigan | 356/1 |
| 4,311,383 | 1/1982 | Ohtsubo | 356/28.5 |
| 4,316,670 | 2/1982 | Corwin et al. | 356/349 |
| 4,334,777 | 6/1982 | Bien et al. | 356/349 |
| 4,334,779 | 6/1982 | Domey et al. | 356/358 |
| 4,397,550 | 8/1983 | Matsuda et al. | 356/28.5 |
| 4,417,813 | 11/1983 | Bartholomew | 356/349 |
| 4,542,989 | 9/1985 | Remijan | 356/373 |

Primary Examiner—Stephen C. Buczinski
Attorney, Agent, or Firm—Donald R. Campbell; James C. Davis, Jr.; Paul R. Webb, II

[57] ABSTRACT

An optical technique for determining remotely movement of a movable point such as a point on a robotic end effector moving in three-dimensional space, based on observation of moving fringe patterns. In a preferred embodiment, at least one moving interference fringe pattern is projected from at least one spaced pair of coherent point light sources, having different frequencies, and a photodetector responsive to illumination at the movable point is employed to count fringes as they cross the movable point. The difference frequency between the light sources causes the fringes to move at a known rate to provide sense-of-direction information in that this results in the detector output having a frequency component which reflects point motion. Full three-dimensional location is obtained by observing three independent fringe patterns in three independent directions. Such a set of patterns can be produced by as few as three point sources operating at three different frequencies. All three fringe patterns are followed with a single detector, provided the frequency shift introduced for each pattern is substantially different. Thus, if these shifts are represented by $\delta_1$, $\delta_2$, and $\delta_3$, the detector signal can be filtered at corresponding frequencies to separate that part of the signal corresponding to each pattern. This frequency multiplex technique works unambiguously providing $\delta_1$, $\delta_2$, and $\delta_3$, and all differences between these quantities are much greater than frequency shifts introduced by point motion.

4 Claims, 2 Drawing Figures

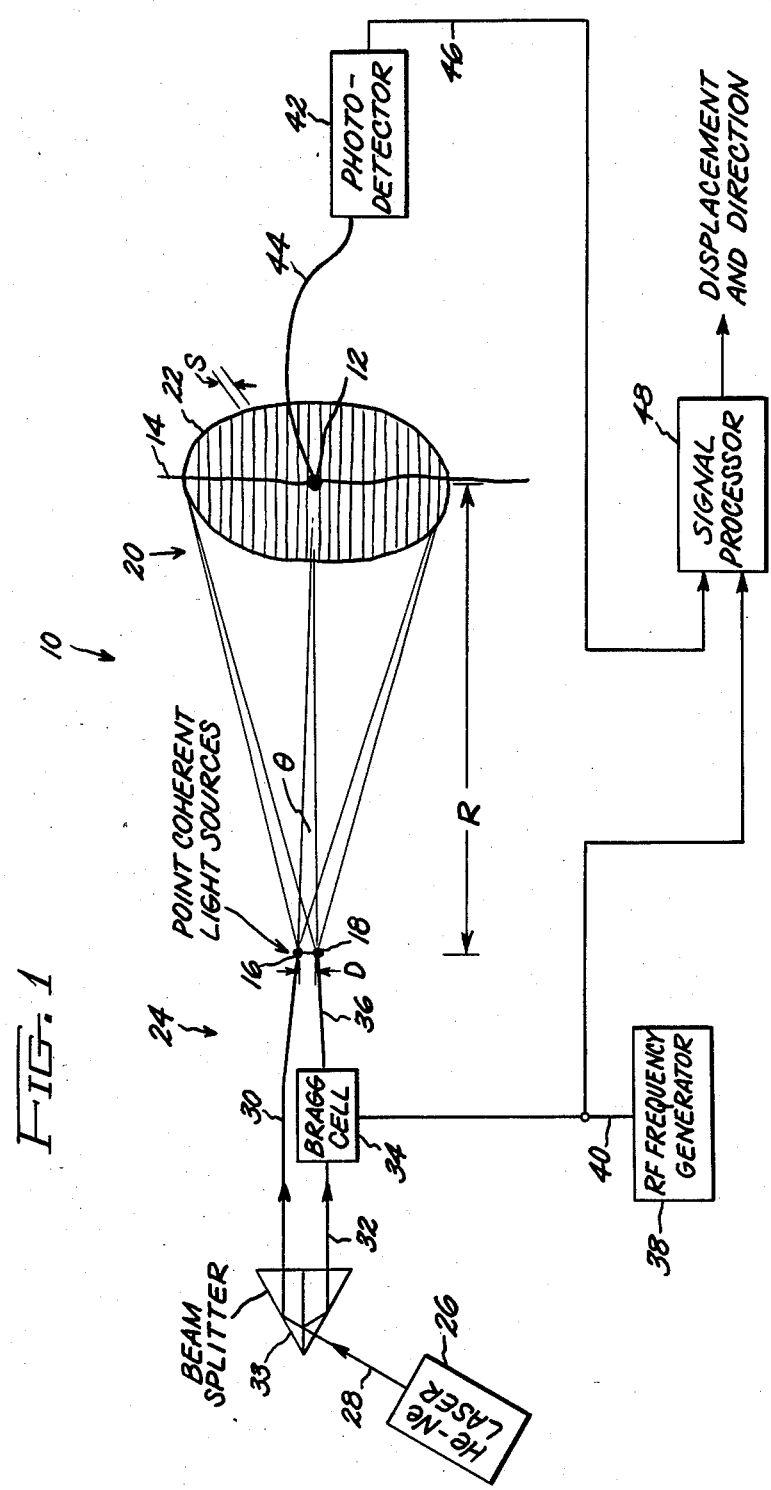

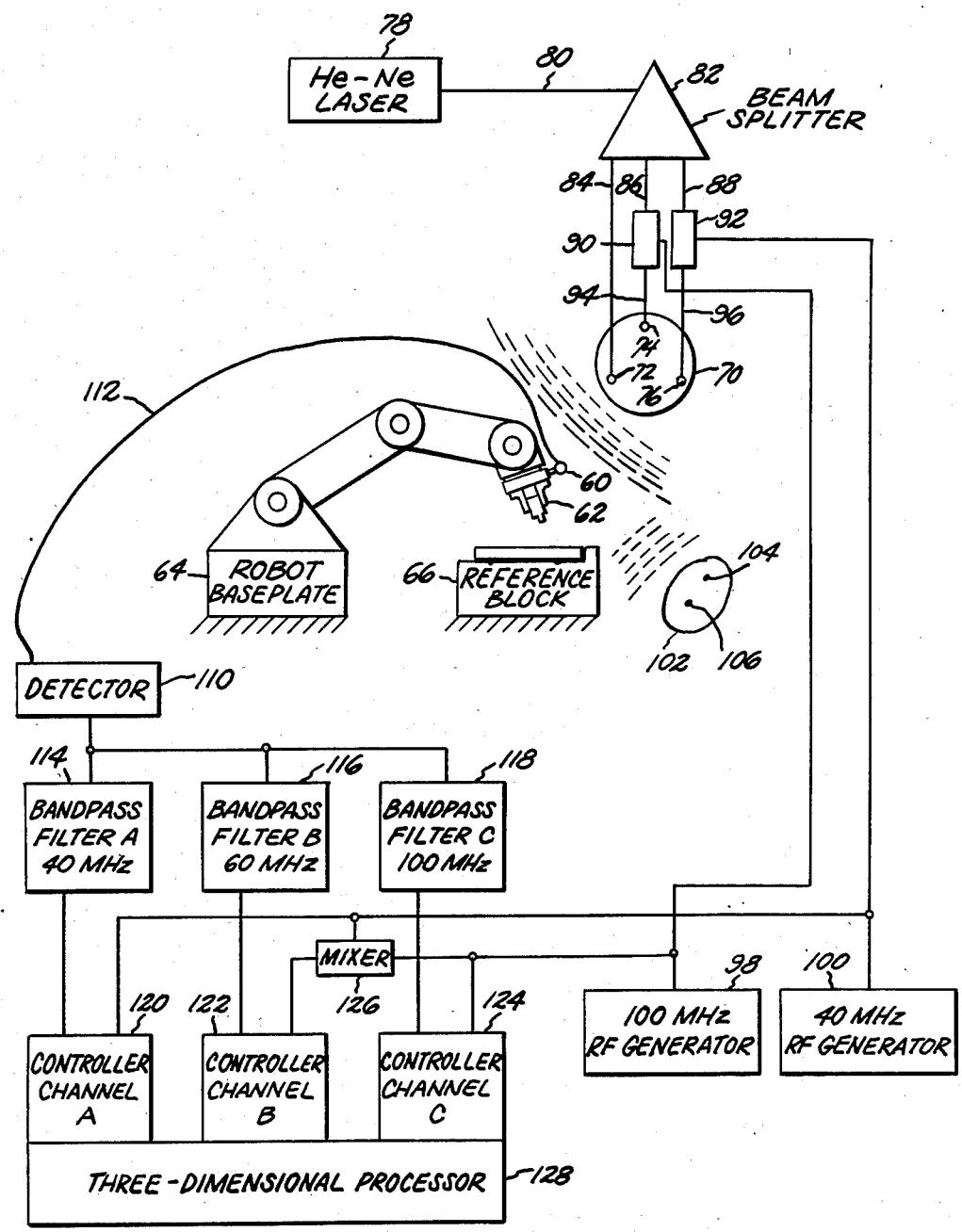

PRECISION REMOTE LOCATION OF A MOVABLE POINT EMPLOYING LIGHT INTERFERENCE FRINGES

This application is a continuation of application Ser. No. 622,906, filed June 21, 1984, now abandoned.

BACKGROUND OF THE INVENTION

The present invention relates to an optical method and system for providing precise real time location in extended three-dimensional space of a movable point; that is, a point which is generally in motion, such as a point which is located on a robotic end effector.

Precise location of parts which move, either in three-dimensional space or merely along a line, is necessary in many applications. Examples include work-performing tools and robotic end effectors. More particularly, precise location of robotic end effectors to an accuracy of at least one mil ($1 \times 10^{-3}$ inch) over a volume of several feet in each dimension is highly desirable in order to provide feedback for accurate metrology, machining and assembly operation. Previous approaches to this problem do not provide the combination of accuracy, working volume, time response, and non-contact remote operation needed for robotic end effector control.

Typically, location of robotic end effectors is accomplished in a mechanical approach by determining the angles of various joints which permit end effector motion and then applying geometrical calculations. However, as a practical matter errors in angle determination, as well as compliance of the joints and limbs, often limit reliable mechanical location to about ten mils accuracy, which is much poorer than the one mil accuracy needed in many cases. Furthermore, the required limb sitffness for even this degree of accuracy adds undesirable weight to the limbs.

Optical approaches to this same problem have also been developed, based, for example, on interferometric and triangulation techniques.

By way of a more particular example, optical interferometric approaches utilize striped patterns which result from the interference of coherent beams of light. As is known, if the beams from a pair of spaced coherent light sources, such as produced by a laser, are projected in generally the same direction, constructive and destructive light wave interference between the two beams produces a striped pattern of alternating light and dark fringes. The separation between the fringes is highly predictable, and is a function of the wavelength of the light involved and of the angle between the two coherent light sources as viewed from any particular point in the region where the light beams intersect.

Thus, in general, it is known to monitor movement across a set of such interference fringes by counting the number of fringes crossed. However, there are a number of disadvantages to such a basic approach. For example, counting fringes alone does not indicate the direction of movement.

Another disadvantage is that ultimate resolution is dependent upon the spacing between fringes, as well as upon the particular technique employed for interpolating position between fringes. Increasing resolution by increasing the fineness of the fringes, such as by decreasing the fringe spacing, is subject to a limitation in that the detector area must be made correspondingly smaller in order to respond to individual fringes. Due to practical limitations on detector sensitivity, this in turn leads to a requirement for increased laser power, which leads to use restrictions due to safety considerations.

Another difficulty with the approach of increasing resolution by providing finer fringes is increased sensitivity to momentary loss of signal due to atmospheric particles or other objects interrupting the laser beam, as well as sensitivity to small vibrations.

Another disadvantage of fringe-counting approaches as previously proposed is that interpolation methods generally rely upon light amplitude information, which is difficult to obtain accurately. As a result of the constructive and destructive interference of the light waves, the fringes do not change instantly from light to dark as a function of distance. Rather, the change is gradual, and typical interpolation methods attempt to determine position between a pair of adjacent fringes by comparing amplitude at a particular point in question with expected maximum amplitude and expected minimum amplitude. Serious errors can be introduced into this interpolation by variations in atmosphere transmission which cause amplitudes to differ from expected values.

SUMMARY OF THE INVENTION

Accordingly, it is an object of the invention to provide methods and apparatus for accurately determining remotely movement and position of a movable point.

It is another object of the invention to provide methods and systems for the precise location of robotic end effectors.

It is yet another object of the invention to provide such methods and systems which can effectively utilize relatively coarse fringes in order to reduce the laser power required and in order to reduce sensitivity to momentary loss of signal.

It is yet another object of the invention to provide such methods and systems which provide accurate determination of distances much smaller than the spacing between fringes.

It is yet another object of the invention to provide such methods and systems which can provide full three-dimensional remote location of a movable point in space while employing only a single photodetector.

It is yet another object of the invention to provide both the position and angular orientation of a body by determining the position of several points on that body.

Briefly, and in accordance with an overall concept of the invention, a pattern of interference fringes is caused to move at a fixed rate by establishing a predetermined difference frequency (frequency offset) between a spaced pair of coherent light sources. It will be appreciated that the term "light" is employed herein in a broad sense, and is not limited to wavelengths in the range of visible light. This moving pattern can readily be accomplished by splitting a laser beam into two paths, and frequency shifting one of the two resultant beams. A presently-preferred technique for this frequency shifting is Bragg scattering from a high-frequency sound (vibrational) beam introduced into a suitable transparent body. Thus, the laser beam can be described as having an initial frequency of $\nu_0$. After scattering, the scattered beam has a frequency of $\nu_0 + \delta$, where $\delta$ is the sound frequency.

The present invention advantageously utilizes such a shift, whereby, in one second, $\delta$ fringes pass a stationary point at which the photodetector is positioned in one second, and these fringes can be counted by a counter monitoring detector response. If, however, the counter monitoring the detector response counts only $\delta-1$ fringes in one second, this indicates that the point moved the distance of one fringe in the direction of fringe motion during that period. Conversely, if $\delta+1$ fringes are counted, then the point has moved the distance of one fringe in the direction opposite to the fringe motion. Likewise, in any time period T if $\delta T$ fringes are counted, then the point has not moved in the direction of fringe travel. However, if $\delta T-x$ fringes are counted, where x is the difference count, then the point has moved a distance $\bar{x}\bar{s}$ in the direction of fringe travel, where $\bar{s}$ is the average fringe spacing over that distance. (The fringe spacings change slowly with direction and range, as discussed subsequently.) Clearly, the average speed during this period is $x\bar{s}/T$.

The frequency-shifting technique of the invention provides several important advantages. Fundamentally, as summarized just above, it enables the direction of movement to be determined.

As another significant advantage, detection accuracy is improved because intensity (amplitude) is not used in detection other than in a binary sense. The detector circuitry is preferably designed so as to be responsive to zero crossings rather than amplitude. Thus, since the interference fringe pattern is moving, distance and point movement are determined based solely on timing observations, permitting accurate measurements at high resolution. In this case, fractional fringe resolution can be obtained by measuring the time between a zero-crossing of the Bragg cell driving signal, and a zero-crossing of the detector signal, and then expressing this time as a fraction of the period of the Bragg cell driving signal. When this period is too short for practical timing to small fractions of the period, known frequency-shifting techniques can be used to reduce the frequencies of both signals while retaining their mutual phase relationship, thereby allowing the period fraction between zero-crossing to be measured over a convenient time span.

In accordance with another overall concept of the invention, full three-dimensional location is obtained by observing three fringe patterns in three independent (but not necessarily orthogonal) directions. As is known, the location of a point in space can be fixed by a minimum of three angles.

The required fringe patterns can be created, for example, by a minimum of three individual coherent point light sources operating at different frequencies and defining three difference frequencies therebetween.

In accordance with a preferred form of the invention, the frequency shifts of the three patterns are different such that they can be separated by electrical filtering, and all three fringe patterns are observed by a single detector. Thus, if three shifts are represented by $\delta_1$, $\delta_2$, and $\delta_3$, the detector signal can be filtered at corresponding frequencies to separate that part (i.e., frequency component) of the detector signal corresponding to each pattern. This frequency multiplexing technique is unambiguous, providing $\delta_1$, $\delta_2$, and $\delta_3$, and all differences between these quantities, are much greater than the frequency shifts introduced by point motion.

It will be appreciated that the signal from the detector, whether resulting from a single interference fringe, or a plurality of interference fringes with corresponding frequencies separated by filtering, can readily be computationally analyzed, preferably in real time, by applying straightforward geometrical analysis to determine motion of the point. Thus, providing the point is initially located at a known reference, subsequent positions are determined by relating motion to the initial reference point.

In accordance with a more particular aspect of the invention, a system for determining movement of a remote point along a path defined in two dimensions includes a spaced pair of coherent light sources having a predetermined difference frequency for projecting a moving pattern of interference fringes along the path defined in two dimensions. A photodetector is provided for intercepting interference fringes at the movable point, and for producing a detector signal having a frequency component determined by the number of interference fringes crossing a remote point per unit time. A signal processor then compares the detector signal frequency component to the light source frequency to determine both the direction and the velocity of point movement along the path defined in two dimensions.

In accordance with another aspect of the invention, a multi-dimensional system for determining movement of a remote point within a working volume such as a point on a robot includes at least three spaced coherent light sources having predetermined difference frequencies and constituting a defined number of light source pairs. The sources of each light source pair have a unique difference frequency and each light source pair projects within the working volume a corresponding moving pattern of interference fringes which is independent of the moving pattern of interference fringes from each of the other light source pairs. A photodetector intercepts interference fringes at the movable point and provides a detector signal having, for each of the moving patterns of interference fringes, a frequency component determined by the number of interference fringes crossing the movable point per unit time. A filter is provided for each of the light source pairs for separating out of the detector signal the frequency component of the corresponding moving pattern of interference fringes. Finally, a signal processor is provided for comparing each detector frequency component to the light source difference frequency component of the corresponding pair to determine the change of position of the point over any time interval.

A method in accordance with the invention for determining movement of a movable point includes the steps of projecting at least one moving pattern of interference from a spaced pair of coherent light sources having a predetermined difference frequency. The method further includes the step of intercepting the interference fringes at the movable point and generating a signal having at least one frequency component determined by the number of interference fringes of the one moving pattern crossing the movable point per unit time. Finally, the method comprises the step of comparing the frequency component to the light source difference frequency component to determine the change of position of the point over any time interval.

For determining actual position of the movable point, the method comprises the further steps of initializing the movable point to a known reference position, and of determining a subsequent position of the movable point at a later time by modifying the coordinates of the reference position in accordance with the measured change of position.

With the present invention, a precision of 25 $\mu$m (one mil) is attainable over a working volume of at least one cubic meter with a point velocity of up to ten meters per second, and employing a total projected light power of less than 10 mW.

BRIEF DESCRIPTION OF THE DRAWINGS

While the novel features of the invention are set forth with particularity in the appended claims, the invention, both as to organization and content, will be better understood and appreciated by the following detailed description, taken in conjunction with the drawings, in which:

FIG. 1 is a diagrammatic view of a one-dimensional system illustrating the invention; and FIG. 2 depicts a three-dimensional system in accordance with the invention for following a point on a robotic end effector.

DETAILED DESCRIPTION OF THE INVENTION

Referring first to FIG. 1, depicted is a system 10 in accordance with the invention for determining movement of a movable point 12 along a path defined in two dimensions 14. Thus, the system 10 is a one-dimensional system, and represents the simplest form of system of the invention. The path 14, while well defined in two dimensions, is not necessarily straight.

A spaced pair of coherent light sources 16 and 18 project, through constructive and destructive light wave interference, a moving pattern of interference fringes into a working volume, generally designated 20, or at least onto all points of interest along the path defined in two dimensions 14. For the sake of illustration, the resultant fringe pattern is represented at 22 as though projected on a flat screen. It will be appreciated, however, that the interference pattern in actuality exists as a large plurality of interference planes in three-dimensional space projecting generally from the pair of point coherent light sources 16 and 18, and may be completely defined geometrically.

The point coherent light sources 16 and 18 are driven by an optical system 24 comprising, for example, an He-Ne laser 26 operating at a wavelength of 633 nm. An output beam 28 from the laser 26 is split into two beams 30 and 32 by a beam splitter 33. A difference frequency $\delta$ is introduced by directing one of the beams, in this case, the beam 32, through a Bragg cell 34 to provide a frequency shifted beam 36. The frequency offset $\delta$ introduced in the Bragg cell 34 is the same as the output frequency of an RF frequency generator 38 having an output 40, which actually drives the Bragg cell 34. Typically, Bragg cell frequency shifters are operated at frequencies such as 40 MHz, 80 MHz, 100 MHz and 150 MHz.

For intercepting the interference fringes at the remote point 12, a suitable photodetector 42 is provided which senses instantaneous illumination at the point 12 by means of a single-filament fiber optic 44. Alternatively, the fiber optic 44 may be omitted, and the photodetector 42 located at the remote point 12 itself. The output 46 from the photodetector 42 and the output 40 of the RF frequency generator 30 are compared in a signal processor 48 to generate displacement and direction information.

The general expression for fringe separation s within any particular geometry is a fairly complicated but completely understood function of range and the angle between the line from the bisector of the line between the point sources, i.e., the line between 16 and 18 in FIG. 1, to the fringe, and a plane forming the locus of perpendicular bisectors of the line between the point sources. Near that plane, and in the far field (R>>D), this expression simplifies to a good approximation, into $$s = \lambda R/D \tag{1}$$

Small known corrections to this result will be required within the geometry shown in FIG. 1.

As summarized hereinabove, due to the frequency offset $\delta$, between the two beams 30 and 36, the pattern 22 of interference fringes is not stationary. Rather, the fringes move at such a rate that the number of fringes passing a stationary point per unit time is precisely the difference frequency $\delta$ between the two beams 30 and 36, which difference frequency $\delta$ is in turn established by the RF frequency generator 38.

The number of fringes crossing the point 12 per unit time directly determines the frequency of a frequency component on the photodetector output 46. The signal processor 48 compares the detector signal frequency component on the line 46 with the light source difference frequency on the line 40 to determine both the direction and the velocity of point movement along the path defined in two dimensions 14, taking also into account the particular geometrical orientation of the path defined in two dimensions 14 with respect to the pair of point coherent light sources 16 and 18.

When the point 12 is not moving, then the two signals applied to the processor 48 have the same frequency. Stated alternatively, under conditions of no point movement, a counter or analogous element within the signal processor 48 counts the same number of pulses from each signal processor 48 input per unit time. Any difference in the count per unit time indicates movement of the point 12 in a particular direction, depending upon whether the frequency count of the photodetector output 46 has increased or decreased relative to the frequency count of the RF frequency generator 38.

While the signal processor 48 determines fringe crossing, it at the same time takes into account actual fringe spacing at each point of interest on the locus 14, which fringe spacing is defined by Equation (1) and appropriate small corrections, as described hereinabove.

Referring now to FIG. 2, depicted is one embodiment of a three-dimensional system for monitoring movement of a point 60 on a robotic end effector 62. Although not illustrated, it will be appreciated that the positions of several other points can be measured as well, for example, movement of a robot base plate 64 and of a reference block 66.

An optical fringe generator 70 is provided for generating at least three fringe patterns in three independent (although not necessarily orthogonal) directions.

More particularly, the optical fringe generator 70 comprises three spaced coherent light sources 72, 74 and 76 derived from a single He-Ne laser 78. To achieve this, the laser output 80 is directed through a suitable three-way beam splitter 82. One beam 84 directly drives point source 72, while the other two beams 86 and 88 are frequency-shifted by means of separate Bragg cells 90 and 92 to provide frequency-shifted beams 94 and 96 for driving the point sources 74 and 76.

As in FIG. 1, the Bragg cells 90 and 92 are driven by respective RF frequency generators 98 and 100 having respective operating frequencies of, for example, 100 MHz and 40 MHz.

Thus, the three spaced coherent light sources 72, 74 and 76 comprise three light source pairs. The light source pair comprising light sources 72 and 76 has a difference frequency $\delta_1$ of 40 MHz. The light source pair comprising sources 74 and 76 has a difference frequency $\delta_2$ of 60 MHz and the light source pair comprising sources 72 and 74 has a difference frequency $\delta_3$ of 100 MHz.

Thus, each of these light source pairs projects within the working volume a corresponding moving pattern of interference fringes which is independent of the moving pattern of interference fringes from each of the other light source pairs.

While the determination of three angles alone is sufficient to characterize the location of a point in space, it will be appreciated that greater accuracy results if additional light source pairs are provided. A particularly advantageous arrangement is to provide secondary optical fringe generator 102 comprising a pair of light sources 104 and 106 operating at yet another difference frequency $\delta_4$ and positioned such that the interference patterns therefrom are oriented at right angles to the general direction of the interference fringes projected from the primary optical fringe generator 70. With this arrangement, the primary optical fringe generator 70 may be viewed as the primary determiner of accuracy in an X-Y plane, while the secondary optical fringe generator 102 may be considered as the primary determiner of accuracy generally along lines perpendicular to the X-Y plane. It will be appreciated that other advantageous geometries are included within the scope of this invention.

One of the features of the present invention is the ability to follow all three or more fringe patterns with a single detector, such as the detector 110 connected via a fiber optic cable 112 to the point 60. Considering the primary optical fringe generator alone, three frequency shifts $\delta_1$, $\delta_2$, and $\delta_3$ are generated which, in the present example, are at frequencies of 40 MHz, 60 MHz and 100 MHz. For separating these three frequencies, respective band pass filters 114, 116 and 118 are provided, and thus serve to separate out the respective frequency components. It will be appreciated that the frequencies separated out by the filters 114, 116 and 118 are not fixed frequencies, but rather are modulated in accordance with the motion of the point 60. Thus, they may be viewed as frequency-modulated carrier frequencies. However, provided the differences between the three carrier frequencies 40 MHz, 60 MHz and 100 MHz are relatively greater compared to the frequency shifts introduced by the point motion, each can be readily separated from the other.

Signals from the three band pass filters 114, 116 and 118 are passed to individual control channel processors 120, 122 and 124, each of which is also provided with a reference frequency comprising the light signal frequency differences. For this purpose, the controllers 120 and 124 are driven directly by the respective 40 MHz and 100 MHz RF generators 100 and 98, while the necessary 60 MHz reference for the controller channel B is generated by mixer 126.

The outputs of the three controller channels are then applied to a three-dimensional processor 128 for determination of point motion.

With the geometry of FIG. 2, in view of the Equation (1) and comments following it above, it will be appreciated that the fringe spacing for the type interference here concerned is a function of range R and direction from the light sources to the measured point. This variation with position is a known function of the angles and range and can be calculated provided that the measured point is brought initially to a known reference position. These positions can be calculated in real time by a suitably programmed microcomputer connected to the detector 110 or, more particularly, to the outputs of the three filters 114, 116 and 118.

Although only one point 60 whose position is to be determined is illustrated, it will be appreciated that multiple such points can be provided. In some circumstances, this may be absolutely necessary, because, for some positions of the robotic end effector 62, a single sensing element such as the element 60 may be hidden from view. Thus, multiple detectors can be used mounted, for example, on a sphere rigidly attached to an end effector. Such an approach additionally allows precise determination of the orientation, as well as the position of the end effector.

One of the advangages of the present invention is that a relatively coarse fringe spacing may be employed with a consequent relatively low laser power. Detailed analysis of one particular embodiment follows, which analysis illustrates the manner in which required performance capabilities affect the optical's design.

For purposes of example we will assume that the working volume (the volume over which accurate measurements are needed) is a one-meter cube. Maximum point velocity is assumed to be ten meters per second and measurement precision is 25 micrometers (one mil).

In addition, it is assumed that position can be determined through zero-cross detection and timing techniques to a resolution of $\frac{1}{8}$ fringe. Thus, nominal fringe spacing is set equal to 200 $\mu$m (8 mils). This fringe spacing can be obtained at a working distance of one meter using two point light sources spaced two to three mm apart.

In order to provide a strong indication of fringe passage, the detector area dimensions must be suitably smaller than the fringe spacing. This is one of the primary advantages of a relatively coarse fringe spacing, inasmuch as it allows the detector area to be relatively large.

Thus, with a nominal fringe spacing of 200 $\mu$m a detection area of 100 $\mu$m $\times$ 100 $\mu$m is chosen. If the total transmitted power in the two beams creating one fringe pattern is $P_T$ and if this power is spread out over the area subtended by the working volume, then a fraction $$F = P_D/P_T = \frac{\text{area of detector}}{\text{area subtended by working volume}} \quad (2)$$

of the transmitted light reaches the detector. Thus, in this example $$F = 10^{-8} \quad (3)$$

If the maximum velocity across this fringe pattern is $V_{max}$, then the maximum velocity-induced frequency shift is $$v_{max} = V_{max}/s \quad (4)$$

In this example, it is assumed that $V_{max} = 10$ m/s and $s = 200$ $\mu$m. Thus $$v_{max} = 50 \text{ KHz} \quad (5)$$

Since this technique lacks an intrinsic absolute reference, i.e., loss of a cycle in the count record cannot be detected until the end effector is returned to its reference point, the detector signal must have a high signal-to-noise ratio (SNR). The fundamental requirement for a high SNR is that the detector counts a large number of photons (say, 1000) during a signal cycle. The light energy per photon is $$E_\lambda = hc/\lambda \tag{6}$$

where h is Planck's constant and c is the speed of light. For visible light $E_\lambda$ is approximately equal to $4 \times 10$ joules. Typical solid state detector quantum efficiency (fraction of incident photons that are detected) is $$\eta = 50\% \tag{7}$$

The number of detected photons per signal cycle (at a frequency $\nu_{max}$) is $$N_D = P_D \eta / E_\lambda \nu_{max} = 1000 \tag{8}$$

where the second equality expresses the high SNR assumption. Using the Equations (4) and (5) we obtain $$P_T = \frac{1000\, V_{max} E_\lambda}{F \eta s} \tag{9}$$

This Equation (9) gives the required transmitted light power for one set of fringes. Substituting values already assumed or derived for this particular example, we obtain $$P_T = 4 \text{ mW} \tag{10}$$

This power level is easily supplied by continuous wave lasers such as an He-Ne or Argon laser. More generally $$F \approx \left(\frac{\epsilon}{2fL}\right)^2 \tag{11}$$

and $$S = \epsilon/F \tag{12}$$

where $\epsilon$ is the required measurement position, L is the representative dimension of the working volume, f is the detectable fraction of a cycle, and the factor of two in the denominator of Equation (11) derives from the requirement that the detector dimensions must be smaller (here assumed by a factor of two) than the fringe spacing. Thus we obtain $$P_T \sim \frac{4 \times 1000 \times V_{max} E_\lambda f^3 L^2}{\epsilon^3 \eta} \tag{13}$$

Equation (13) reveals more clearly the dependence of the required power (for each fringe pattern) on the maximum velocity $V_{max}$ working volume characteristic dimension L and precision $\epsilon$.

While specific embodiments of the invention have been illustrated and described herein, it is realized that modifications and changes will occur to those skilled in the art. It is therefore to be understood that the appended claims are intended to cover all such modifications and changes that fall within the true spirit and scope of the invention.

What is claimed is:

1. A system for determining the change in position of a point on a robot, comprising:
   at least three spaced coherent light sources having predetermined difference frequencies and constituting a defined number of light source pairs, the sources of each light source pair having a unique difference frequency, and each light source pair projecting throughout a working volume of at least one cubic meter a moving pattern of interference fringes which has a known fringe spacing and is independent of the moving pattern of interference fringes from each of the other light source pairs;
   a single filament fiber optic whose tip is located at said point on said robot, which is movable anywhere within the working volume, and senses instantaneous illumination;
   said fiber optic being coupled to a photodetector that provides a detector signal having, for each of the moving patterns of interference fringes, a frequency component determined by the number of interference fringes crossing said fiber optic tip per unit time;
   a filter for each of said light source pairs for separating out of said detector signal the frequency component of the corresponding moving pattern of interference fringes; and
   a signal processor for comparing each detector signal frequency component to the light source difference frequency of the corresponding pair to determine the change in position of said point on said robot over any time interval.

2. The system of claim 1 wherein said point whose position is monitored is on the robot end effector.

3. A method for determining the position in extended three-dimensional space of a point on a robot that is in motion, comprising:
   projecting at least three moving patterns of interference fringes throughout a working volume of at least one cubic meter from a defined number of pairs of coherent light sources with each pair having a predetermined difference frequency and with each moving pattern independent of the other moving patterns;
   intercepting said interference fringes at said point on said robot with a fiber optic which is coupled to a photo detector and generates a signal having for each of said moving patterns of interference fringes a frequency component determined by the number of interference fringes crossing said fiber optic per unit time;
   providing a filter for each of the light source pairs to separate out of said signal the frequency component of the corresponding moving pattern of interference fringes; and
   comparing each signal frequency component to the light source difference frequency component of the corresponding pair and determining the change in position of said point on said robot over any time interval.

4. The method of claim 3, further comprising initializing said point on said robot to a known reference position, and determining a subsequent position of said point by modifying coordinates of said reference position in accordance with the measured change in position.

* * * * *